United States Patent [19]

McClure et al.

[11] Patent Number: 5,790,770
[45] Date of Patent: Aug. 4, 1998

[54] METHOD AND APPARATUS FOR REDUCING INFORMATION LOSS IN A COMMUNICATIONS NETWORK

[75] Inventors: Robert B. McClure, Hollis; Stephen A. Caldara, Sudbury; Stephen A. Hauser, Burlington; Thomas A. Manning, Northboro, all of Mass.

[73] Assignees: Fujitsu Network Communications, Inc., Richardson, Tex.; Fujitsu Limited, Kawasaki, Japan

[21] Appl. No.: 685,182

[22] Filed: Jul. 18, 1996

Related U.S. Application Data

[60] Provisional application No. 60/001,498 Jul. 19, 1995.
[51] Int. Cl.⁶ .......................... G06F 13/38; G06F 15/16; H04L 12/56
[52] U.S. Cl. ................. 395/200.61; 395/200.53; 370/401; 370/388
[58] Field of Search ............... 395/200.53, 684, 395/200.51, 872, 200.61, 200.57; 370/412, 424, 452, 397, 269, 384, 388, 401, 466, 471, 382; 364/DIG. 1, DIG. 2

[56] References Cited

U.S. PATENT DOCUMENTS 3,804,991  4/1974  Hammond et al. ................. 179/26
3,974,343  8/1976  Cheney et al. ................... 179/18 ES (List continued on next page.)

FOREIGN PATENT DOCUMENTS 484943  3/1992  Japan .

OTHER PUBLICATIONS

R. Jain, "Myths About Congestion Management in High-speed Networks", Internetworking Research and Experience. vol. 3, 1992, pp. 101–113.

Flavio Bonomi et al., "The Rate-Based Flow Control Framework for the Available Bit Rate ATM Service", IEEE Network Magazine, Mar./Apr. 1995, pp. 25–39.

*Head Of Line Arbitration In ATM Switches With Input-Output Buffering and Backpressure Control.* By Hosein F. Badran and H. T. Mouftah, Globecom '91, pp. 0347–0351.

An Ascom Timeplex White Paper, *Meeting Critical Requirements with Scalable Enterprise Networking Solutions Based on a Unified ATM Foundation*, pp. 1–12, Apr. 1994.–Apr. 1995?.

(List continued on next page.)

*Primary Examiner*—Daniel H. Pan
*Attorney, Agent, or Firm*—Weingarten, Schurgin, Gagnebin & Hayes LLP

[57] ABSTRACT

The invention comprises a method and apparatus for reducing information loss in a communications network. In accordance with the method of the invention, a plurality of virtual connections are sent over a first link from a first node in the communications network to a second node. The first and second nodes comprise a plurality of input queues coupled to a switching network which is in turn coupled to a plurality of output queues. Each virtual connection is associated with a first output queue in the first node and a second input queue and a second output queue in the second node. A connection feedback signal is provided from the second node to the first node comprising data reflecting the status of the second input queue associated with a virtual connection. The flow of information between the first node and the second node is controlled for each virtual connection in response to the connection feedback signal associated with that virtual connection. In addition, a switch feedback signal is provided from the second output queue to the second input queue for each virtual connection. The switch feedback signal for a particular virtual connection comprises data reflecting the status of the second output queue associated with the virtual connection and is used to control the flow of information between the second input queue and the second output queue for each virtual connection in response to the switch feedback signal associated with that virtual connection.

31 Claims, 1 Drawing Sheet

U.S. PATENT DOCUMENTS

| | | | |
|---|---|---|---|
| 4,069,399 | 1/1978 | Barrett et al. | 179/15 AL |
| 4,084,228 | 4/1978 | Dufond et al. | 364/200 |
| 4,240,143 | 12/1980 | Bessemer et al. | 364/200 |
| 4,603,382 | 7/1986 | Cole et al. | 364/200 |
| 4,710,916 | 12/1987 | Amstutz et al. | 370/424 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,748,658 | 5/1988 | Gopal et al. | 379/221 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,157 | 10/1989 | Hemmady et al. | 370/60 |
| 4,872,159 | 10/1989 | Hemmady et al. | 370/60 |
| 4,872,160 | 10/1989 | Hemmady et al. | 370/60 |
| 4,872,197 | 10/1989 | Pemmaraju | 379/93 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,833 | 1/1990 | Kent et al. | 370/85.2 |
| 4,897,841 | 1/1990 | Gang Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,942,574 | 7/1990 | Zelle | 370/85.15 |
| 4,947,390 | 8/1990 | Sheehy | 370/85.13 |
| 4,953,157 | 8/1990 | Franklin et al. | 370/60 |
| 4,956,771 | 9/1990 | Neustaedter | 395/872 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,014,192 | 5/1991 | Mansfield et al. | 364/200 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,827 | 3/1992 | Franklin et al. | 370/60.1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 395/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Faulk Jr. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 6/1994 | Proctor et al. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,341,483 | 8/1994 | Frank et al. | 395/400 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,363,497 | 11/1994 | Baker et al. | 395/425 |
| 5,365,514 | 11/1994 | Hershey et al. | 370/17 |
| 5,369,570 | 11/1994 | Parad | 364/401 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |

| Patent | Date | Inventor | Class |
|---|---|---|---|
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock II | 395/200 |
| 5,394,396 | 2/1995 | Yoshimura et al. | 370/60 |
| 5,394,397 | 2/1995 | Yanagi et al. | 370/60.1 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,418,942 | 5/1995 | Krawchuk et al. | 395/600 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,426,635 | 6/1995 | Mitra et al. | 370/60 |
| 5,432,713 | 7/1995 | Takeo et al. | 364/514 |
| 5,432,784 | 7/1995 | Ozveren | 370/60.1 |
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/60.1 |
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,448,621 | 9/1995 | Knudsen | 379/58 |
| 5,450,406 | 9/1995 | Esaki et al. | 370/60.1 |
| 5,452,296 | 9/1995 | Shimizu | 370/60.1 |
| 5,454,299 | 10/1995 | Thessin et al. | 370/62 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,611 | 10/1995 | Drake Jr. et al. | 370/54 |
| 5,463,620 | 10/1995 | Sriram | 370/60 |
| 5,463,629 | 10/1995 | Ko | 370/110.1 |
| 5,463,775 | 10/1995 | DeWitt et al. | 395/184.01 |
| 5,465,331 | 11/1995 | Yang et al. | 395/200 |
| 5,465,365 | 11/1995 | Winterbottom | 395/600 |
| 5,469,003 | 11/1995 | Kean | 326/39 |
| 5,473,608 | 12/1995 | Gagne et al. | 370/85.13 |
| 5,475,679 | 12/1995 | Munter | 370/58.2 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,517,495 | 5/1996 | Lund et al. | 370/60 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Digne et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,550,823 | 8/1996 | Irie et al. | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 |

OTHER PUBLICATIONS

Douglas H. Hunt, *ATM Traffic Management –Another Perspective*, Business Communications Review, Jul. 1994.

Richard Bubenik et al., *Leaf Initiated Join Extensions*, Technical Committee, Signalling Subworking Group, ATM Forum/94–0325R1, Jul. 1, 1994.

Douglas H. Hunt et al., *Flow Controlled Virtual Connections Proposal for ATM Traffic Management (Revision R2)*, Traffic Management Subworking Group, ATM–Forum/94–0632R2, Aug. 1994.

Flavio Bonomi et al., *The Rate–Based Flow Control Framework for the Available Bit Rate ATM Service*, IEEE Network, Mar./Apr. 1995, pp. 25–39.

R. Jain, *Myths About Congestion Management in High Speed Networks*, Internetworking Research and Experience, vol. 3, 101–113 (1992).

Douglas H. Hunt et al., *Credit–Based FCVC Proposal for ATM Traffic Management (Revision R1)*, ATM Forum Technical Committee Traffic Management Subworking Group, ATM_Forum/94–0168R1, Apr. 28, 1994.

Douglas H. Hunt et al., *Action Item Status for Credit–Based FCVC Proposal*, ATM Forum Technical Committee Traffic Management Subworking Group, ATM _Forum/94–0439, Apr. 28, 1994.

Timothy P. Donahue et al., *Arguments in Favor of Continuing Phase 1 as the Initial ATM Forum P–NNI Routing Protocol Implementation*, ATM Forum Technical Committee, ATM Forum/94–0460, Apr. 28, 1994.

Richard Bubenick et al., *Leaf Initiated Join Extensions*, Technical Committee, Signalling Subworking Group, ATM Forum/94–0325, Apr. 28, 1994.

Rob Coltun et al., *PRP: A P–NNI Routing Protocol Proposal*, ATM Forum Technical Committee, ATM _Forum/94–0492, Apr. 28, 1994.

Richard Bubenik et al., *Leaf Initiated Join Extensions*, ATM Forum Technical Committe, Signalling Subworking Group, ATM Forum 94–0325, Apr. 28, 1994.

Richard Bubenik et al., *Requirements For Phase 2 Signaling Protocol*, ATM Forum Technical Committee, Signalling Subworking Group, ATM Forum 94–1078, Jan. 1, 1994.

H.T. Kung and K. Chang, *Receiver–Oriented Adaptive Buffer Allocation in Credit–Based Flow Control for ATM Networks*, Proceedings of INFOCOM '95, Apr. 2–6, 1995, pp. 1–14.

H.T. Kung et al., *Credit–Based Flow Control for ATM Networks: Credit Update Protocol, Adaptive Credit Allocation, and Statistical Multiplexing*, Proceedings of ACM SIGCOMM '94 Symposium on Communications Architectures, Protocols and Applications, Aug. 31–Sep. 2, 1994, pp. 1–14.

SITA, ATM RFP: C–Overall Technical Requirements, Sep. 1994.

Hosein F. Badran et al., *Head of Line Arbitration in ATM Switches with Input–Output Buffering and Backpressure Control*, Globecom, pp. 347–351, 1991.

METHOD AND APPARATUS FOR REDUCING INFORMATION LOSS IN A COMMUNICATIONS NETWORK

REFERENCE TO RELATED APPLICATION

This application claims the benefit of U.S. Provisional application Ser. No. 60/001,498, filed Jul. 19, 1995.

TECHNICAL FIELD OF THE INVENTION

The invention relates generally to communications networks and more particularly to a method and system for reducing information loss in a communications network.

BACKGROUND OF THE INVENTION

Communications networks such as asynchronous transfer mode ("ATM") networks are used for transfer of audio, video, and other data. ATM networks deliver data by routing data units such as ATM cells from sources to destinations through switches. Switches (or nodes) include input/output ports through which ATM cells are received and transmitted. Switches in a communications network are connected by a series of links.

One problem associated with ATM networks is loss of cells due to congestion. Cells are buffered within each switch before being routed and transmitted from the switch. More particularly, switches typically have buffers at either the inputs or outputs of the switch (or both) for temporarily storing cells prior to transmission. As network traffic increases, there is an increasing probability that buffer space may be inadequate and data lost. If the buffer size is insufficient, cells are lost. Cell loss causes undesirable interruptions in audio and video data transmissions, and may cause more serious damage to other types of data transmissions. Avoidance of cell loss is therefore desirable. Note that cells can be lost due to congestion on links between nodes or due to congestion within a node itself. Avoiding cell loss due to either type of congestion is desirable.

For one type of network traffic, cell loss is particularly problematic. An available bit rate service is used when the application can tolerate order of magnitude variations in delay and requires a low cost service. To achieve a low cost service, bandwidth and buffering resources are shared among many connections. The service is low cost because bandwidth is not reserved for each connection and the bandwidth left unused by delay sensitive connections can be used by these connections.

The most critical quality of service aspect for available bit rate service is cell loss. The major reason why available bit rate service is used is because burst size and periodicity is unpredictable and an economical service is desired. Typically, the burst size requires a group of cells. If one cell does not reach it's destination, then from the perspective of the recipient of the information, cell loss triggers resending of cells, which results in a higher delay. From the sender's viewpoint, if a cell does not reach its destination, then the resources used to get the other cells of a frame to the destination are wasted, because all cells in a frame are resent when a cell from the group is lost. Accordingly, delay and resource usage for an unpredictable available bit rate service may be minimized by achieving zero cell loss. The term "zero cell loss" refers to cells lost due to congestion in the network.

SUMMARY OF THE INVENTION

The invention comprises a method and apparatus for reducing information loss in a communications network. In accordance with the method of the invention, a plurality of virtual connections are sent over a first link from a first node in the communications network to a second node in the communications network. The first and second nodes each comprise a plurality of input queues coupled to a switching network, the switching network in turn coupled to a plurality of output queues. Each virtual connection is associated with a first output queue in the first node and with a second input queue and second output queue in the second node.

A connection feedback signal is provided from the second node to the first node for each virtual connection which reflects the status of the second input queue associated with that virtual connection. The flow of information between the first node and the second node is controlled in response to the connection feedback signal for a particular virtual connection or group of virtual connections. A switch feedback signal is also provided from the second output queue to the second input queue for each virtual connection comprising data reflecting the status of the second output queue associated with the particular virtual connection or group of virtual connections. The flow of information between the second input queue and the second output queue for each virtual connection is controlled in response to the switch feedback signal associated with the virtual connection.

The invention has several important technical advantages. The invention allows flow control on a per connection basis over each link, on a per connection basis through each node, and on a per group of connections basis over a link or through a node. Thus, the invention allows cell loss to be minimized both through the switch and across each link in a cell-based communications network. Minimizing cell loss allows more efficient use of network resources and minimizes delay through the network. In effect, the invention achieves zero cell loss due to congestion.

When controlling the flow of cells through the switch, the invention may implement flow control on a per virtual connection basis. Virtual connections may use dedicated or shared buffer resources. Shared buffer resources may be associated with the connection's traffic type, but could also be implemented based upon traffic subtypes. Flow control per virtual connection takes into account the state of dedicated and shared resources. By implementing flow control on a per connection basis, the invention allows efficient point-to-multipoint and multipoint-to-point operation within a node.

The invention allows flow control over a link at both the link level and on a per connection basis. Accordingly, because link flow control requires less link bandwidth to implement than per connection flow control over a link, the update frequency for a network employing the invention may be high for the link flow control and low for the per connection flow control. The end result is a low effective update frequency as link level flow control exists only on a once per link basis whereas the link typically has many connections within it, each needing its own flow control. The invention thus minimizes the wasting of link bandwidth to transmit flow control update information.

However, because the whole link now has a flow control mechanism ensuring lossless transmission for it, and thus for all of the connections within it, buffers may be allocated from a pool of buffers and thus connections may share access to available buffer space. Sharing buffer space means that fewer buffers are needed since the projected buffers required for a link in the defined known time interval are less than the projected buffers that would be required if independently calculated in sum for all of the connections within the link for the same time interval. Furthermore, the high update frequency that may be used on the link level flow control without undue wasting of link bandwidth allows further minimization of the buffers that must be assigned to a link. Minimizing the number of cell buffers at the receiver significantly decreases net receiver cost.

The invention allows connections to be made that use both link flow control and switch flow control. Other connections can co-exist on the same link or in the same switch that do not use either link flow control, switch flow control, or both. These connections are not included in the link flow control accounting system. For example, constant bit rate connections may or may not use link flow control. Yet, the invention allows such connections to be multiplexed with available bit rate connections that do use link flow control.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

Figure 1:
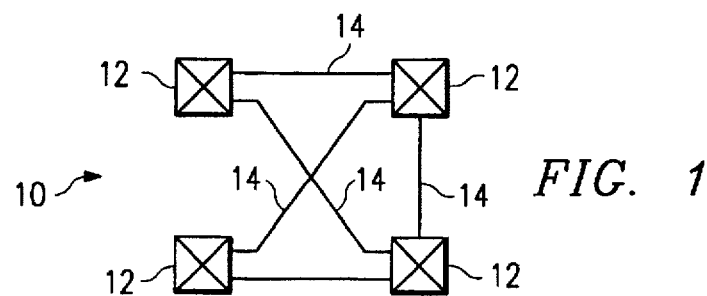
FIG. 1 illustrates a communications network constructed in accordance with the invention.
Figure 2:
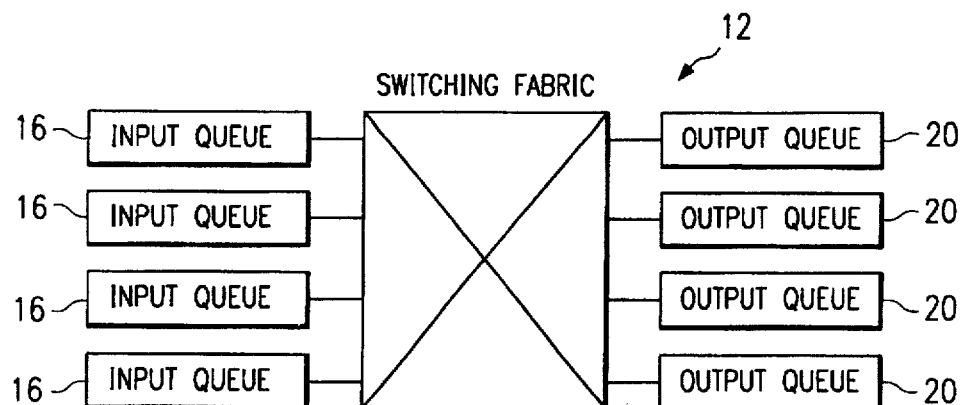
FIG. 2 illustrates a block diagram of a node of the communications network of FIG. 1.
Figure 3:
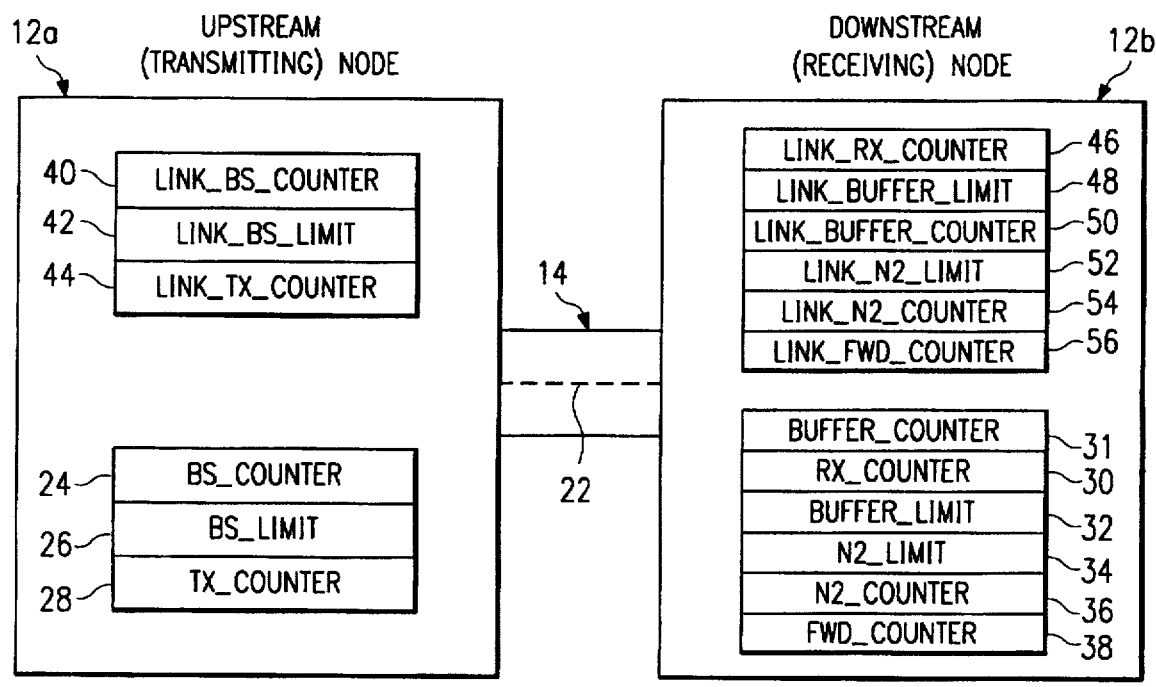
FIG. 3 illustrates a portion of the communications network of FIG. 1 demonstrating the use of flow control over a communications link.

The preferred embodiment of the present invention and its advantages are best understood by referring to FIGS. 1 through 3 of the drawings, like numerals being used for like and corresponding parts of the various drawings.

FIG. 1 illustrates a communications network constructed in accordance with the teachings of the invention. Communications network 10 comprises a plurality of nodes 12 connected by a plurality of links 14. Each node 12 comprises a communications device which may be referred to as a switch. Communications network 10, in this embodiment, is a cell based communications network wherein information is transmitted in cells. Each cell comprises a header portion and a data portion. In this embodiment, communications network 10 is an asynchronous transfer mode (ATM) network. The invention may be used in communications networks other than cell based networks without departing from the scope of the invention.

Communications network 10 employs multiple flow control mechanisms to minimize cell loss both between and within nodes 12 of the communications network 10. In this embodiment, flow control is provided both through a node 12 and between nodes 12 over a communications link 14. Within a node 12, flow control is provided on a per connection basis or group of connections basis. Between nodes 12, flow control is provided over a link 14 on both a per connection basis and on a link basis. Flow control through the switch may be referred to as switch flow control or switch per connection flow control. Flow control over one of the links 14 at the link level may be referred to as link flow control. Flow control over a link on a per connection basis may be referred to as link per connection flow control.

FIG. 2 illustrates a block diagram of a node 12 of communications network 10 that will be used to describe the method used to control flow through each node 12 (switch flow control). Each node 12 comprises a plurality of input queues 16, a switching fabric 18, and a plurality of output queues 20. Input queues 16 are coupled to switching fabric 18 which is in turn coupled to output queues 20. Information from input queues 16 flows through the switching fabric 18 to output queues 20. In this embodiment, each input queue 16 is uniquely assigned to a particular connection through node 12 and each output queue 20 is uniquely assigned to a particular connection through node 12. By providing a unique input queue 16 and output queue 20 for each virtual connection, flow control through the node 12 is simplified.

Each connection is assigned bandwidth types based on the traffic type associated with the connection. There are two types of bandwidth to assign within the switch: allocated and dynamic. Allocated bandwidth is bandwidth of switching fabric 18, which is "reserved" for use by the connection to which the bandwidth is allocated. Generally, a connection with allocated bandwidth is guaranteed access to the full amount of bandwidth allocated to that connection. As such, traffic types that need deterministic control of delay are assigned allocated bandwidth. Dynamic bandwidth is bandwidth that is "shared" by any of various competing connections. Because dynamic bandwidth is a shared resource, there is generally no guarantee that any particular connection will have access to a particular amount of bandwidth. For this reason, dynamic bandwidth is typically assigned to connections with larger delay bounds. Other connections may be assigned a combination of dynamic and allocated bandwidths.

The present invention employs a digital feedback message with first and second bits to facilitate switch flow control. The feedback message may include an ACCEPT message which can be sent from the output queue 20 to the input queue 16 associated with a particular connection. More particularly, using the first bit of the feedback message, first bit equals zero indicates an ACCEPT of an input queue request to transfer a cell to an output queue 20. When ACCEPT is received by the requesting input queue 16, the cell is transferred to the output queue 20. The feedback message may also include a REJECT message. When REJECT is received by the requesting input queue 16, the cell is not transferred. However, further requests to transfer may be sent to the input queue 16.

The feedback message may also include an XOFF (dynamic) message which temporarily halts transmission of requests to transfer via dynamic bandwidth. Each input queue 16 receiving XOFF (dynamic) from a particular output queue 20 temporarily ceases submitting requests to transmit to that particular output queue 20 via dynamic bandwidth until a specified event occurs. The specified event could be passage of a pre-determined amount of time or receipt of an XON signal which enables further requests to transfer to be sent. The input queues 16 could also be enabled with an XON signal on a regular basis, i.e., without regard to when each particular input queue 16 was placed in the XOFF (dynamic) state. Such a regular basis could be for example, every 100 milliseconds. When the second bit of the two bit message equals 0, a NO-OP (no operation) signal. Each input queue 16 receiving a NO-OP signal is not disabled.

The feedback message may also include an XOFF (allocated) feedback message. Each input queue 16 receiving XOFF (allocated) from a particular output queue 20 temporarily ceases submitting requests to transmit to that particular output queue 20 by allocated bandwidth until a specified event occurs. The specified event is typically receipt of an XON signal which enables further requests to transfer to be sent. The input queues 16 could also be enabled with an XON signal on a regular basis, i.e., without regard to when each particular input queue 16 was placed in the XOFF (allocated) state. Such a regular basis could be, for example, every 100 milliseconds. When the second of the two bit message equals 0, such indicates a NO-OP signal. Each input queue 16 receiving a NO-OP (no operation) signal is not disabled.

In this embodiment, an XON signal is used to enable input queues 16 which have been placed in either XOFF state. Each input queue 16 receiving XON from a particular output queue 20 is able to transmit requests to transmit to that output queue 20. More particularly, the XON resets both the XOFF (dynamic) and XOFF (allocated) states. The XON signal can be used in conjunction with enabling on a regular basis to both reduce unnecessary switch traffic and prevent flow blockage due to errors.

Various combinational responses to a request to transmit may be received by the requesting input queue 16. Receipt of XON and either accept or REJECT operates as described above. Receipt of either XOFF (dynamic) and ACCEPT or XOFF (allocated) and ACCEPT indicates that further requests to transfer via the designated bandwidth type should cease following transfer of one cell. Receipt of XOFF (dynamic) and REJECT or XOFF (allocated) and REJECT indicates that further requests to transfer via the designated bandwidth type should cease immediately and no cells may be transmitted. Thus, the XOFF commands affect future requests while the REJECT command provides for denial of the current request.

The NO-OP/XOFF (dynamic) message is employed to reduce unnecessary feedback signaling within the switch. Switch bandwidth is lost when REJECT is repeatedly asserted when a cell cannot be transmitted through the switch. XOFF (dynamic) is thus used to reduce the number of requests made to a full output queue 20.

Flow control with the feedback messages described above provides reliable point-to-multipoint transmission within the switch, i.e., transmission from a single input queue 16 to multiple output queues 20. In point-to-multipoint operation, the feedback messages from the multiple output queues 20 the single input queue 16 are logically OR'd such that a single XOFF (dynamic) or REJECT message from any one of the plurality of output queues 20 prevents transmission. Thus, point-to-multipoint cells are transmitted at the rate of the slowest output queue 20.

Flow control with the two bit feedback messages described above also provides reliable multipoint-to-point transmission within the switch, i.e., transmission from multiple input queues 16 to a single output queue 20. Each output queue 20 has a threshold, and sends the XON message when the output queue 20 drains to that threshold. In multipoint-to-point operation, the XON threshold of the output queue 20 is dynamically set to reserve sufficient space for each input queue 16 to transmit to the output queue 20. For example, if there are 8 input queues 16 then the threshold is set to 8 so the output queue 20 will free sufficient space to receive all of the cells contemporaneously in serial fashion.

Thus, the feedback mechanism of the invention avoids cell loss within node 12. When the output queues 20 become filled to a pre-determined threshold level, a feedback message is provided to the input queue 16 to prevent transmission of cells from the input queue 16 to the output queues 20. If the number of cells transmitted to the output queues 20 is greater than the number of available locations within the output queue 20, then cells are lost. However, when the output queues become filled to the threshold level, the feedback message is transmitted to the input queue 16 to prevent transmission of cells from the input queues 16. The threshold level is set to a value which prevents transmission of more cells than can be handled by the available space in the output queues 20. Hence, cell loss between the input queue 16 and output queues 20 is prevented by the flow control feedback message.

In this embodiment, the input queue 16 and output queues 20 are assigned to traffic type groups in order to provide traffic flow control if shared resources are being utilized. By assigning a unique queue per connection, flow control can then be implemented on a per connection basis. Flow control can also be implemented on a per traffic type basis. Flow control can also be implemented on a per connection basis. In addition, nested queues of queues may be employed to provide per traffic type, per connection flow control. As discussed above, each connection is assigned bandwidth based upon the traffic type associated with the connection.

In a node 12, in order to distinguish between cells associated with connections utilizing dynamic bandwidth, allocated bandwidth, or both, each cell is tagged. More particularly, transfer requests of a connection utilizing dynamic bandwidth are tagged with a bit in a first state and transfer requests of a connection using allocated bandwidth are tagged with the bit in a second state. If the connection is above the allocated cell rate, then the cell is tagged as dynamic. If the connection is operating at or below the allocated cell rate then the cell is tagged as allocated.

TABLE I

| FEED BACK MESSAGE | | |
|---|---|---|
| BIT 1 | BIT 2 | MEANING |
| 0 | 0 | ACCEPT NO-OP |
| 0 | 1 | ACCEPT XOFF (dynamic) |
| 1 | 0 | REJECT NO-OP |
| 1 | 1 | REJECT, XOFF (dynamic) |

Referring to Table I, the feedback message is provided in response to a request message from an input queue 16. Prior to transmitting a cell from an input queue 16 to an output queue 20, the request message is sent from the input queue 16 to the output queue 20 to determine whether sufficient space is available in the output queue 20. The feedback message provides an indication of the status of the output queue 20 and transmission proceeds accordingly. The request message proceeds cell transfer within the switch so that cells are only transferred under selected conditions.

In order to provide efficient flow control, the feedback message from the output queue 20 to the input queue 16 includes several subtype messages. For example, the feedback message includes an ACCEPT message which may be sent in response to the request message. Using a 1-bit digital signal, a first bit equals 0 indicates an ACCEPT of an input queue request to transfer a cell to a particular output queue 20. When ACCEPT is received by the requesting input queue 16, the cell is transferred to the output queue 20.

The feedback message also includes a REJECT message. More particularly, the response to the request message may include either an ACCEPT or REJECT message. Using the 1-bit digital signal, a first bit equals 1 indicates a REJECT of the request to transfer a cell to the output queue 20. When REJECT is received by the requesting input queue 16, the cell is not transferred to the output queue 20. However, further request messages may be sent from the input queue 16 to the output queue 20.

In order to reduce the likelihood of lock-up in switch flow control, it may be desirable to employ time-out type functions which will allow continued operation despite the failure of internal elements such as ports. For example, an input queue 16 which has ceased transmission of request messages to a particular output queue 20 following receipt of an XOFF (dynamic) message may transmit a further request message to that output queue 20 if an XON message is not received from that output queue 20 within a predetermined interval of time. Alternatively, input queue 16 may periodically transmit request messages regardless of XOFF (dynamic) state.

Thus, the invention allows flow control within a node 12 by providing feedback signals from the output queues 20 to the input queue 16 such that cells are not transferred between an input queue 16 and an output queue 20 through the switching fabric 18 if the cells would be lost in output queue 20. The invention also provides flow control across each communications link. More specifically, the invention may provide both link level flow control and link per connection flow control.

FIG. 3 illustrates a connection between an upstream transmitting node 12a and a downstream (receiving) node 12b. A connection 22 travels across link 14 between upstream node 12a and downstream node 12b. In this example, upstream node 12a and downstream node 12b comprise switching nodes of communications network 10. Alternatively, either transmitting node 12a or receiving node 12b could be end stations connected to communications network 10.

The link per connection flow control mechanism will first be described. In the illustrated connection, data cells are being transferred between upstream node 12a and downstream node 12b over connection 22. In this embodiment, the cells associated with connection 22 are stored in an input queue associated with connection 22 in downstream node 12b. Data cells are released from the input queue in downstream node 12b associated with connection 22 either through forwarding to another link beyond downstream node 12b or through cell utilization within the downstream node 12b. The latter event can include the construction of data frames from the individual data cells if the downstream element 12b is in an end node such as a workstation.

Two buffer state controls are provided in upstream node 12a, BS_Counter 24 and BS_Limit 26. In this embodiment, each counter is a 14-bit counter, allowing a connection to have 16,383 buffers. This number would support, for example, 139 Mega bits per second Mbps 10,000 km round-trip service. The buffer state counters 24, 26 are employed only if the connection 22 in question is flow-control enabled. That is, a bit in a respective connection descriptor a queue descriptor, associated with the connection 22 is set indicating that the connection 22 is flow-control enabled.

BS_Counter 24 is incremented each time a data cell is transferred out of the upstream node 12a over the connection 22 to downstream node 12b. Periodically, as described below, this counter 24 is adjusted during an update event based upon information received from the downstream node 12b. BS_Counter 24 thus presents an indication of the number of data cells either currently being transmitted in the connection 22 between the upstream and downstream elements 12a, 12b or yet unreleased from buffers in the downstream node 12b.

BS_Limit 26 is set at connection configuration time to reflect the number of buffers available within downstream node 12b for the input queue associated with the connection 22. In other words, BS_Limit 26 reflects the capacity of the input queue in downstream node 12b associated with connection 22. For instance, if BS_Counter 24 for this connection 22 indicates that 20 data cells have been transmitted and BS_Limit 26 indicates that this connection 22 is limited to 20 cells in the input queue in downstream node 12b, then further transmissions from upstream node 12a to downstream node 12b will be inhibited until an indication is received from downstream node 12b that further buffer space is available for connection 22.

Tx_Counter 28 is used to count the total number of data cells transmitted by upstream node 12a through connection 22. In this embodiment, this is a 28-bit counter which rolls over. As described below, Tx_Counter 28 is used during a check event to account for errored cells for this connection 22.

In the downstream node 12b, a set of counters is also maintained for each connection. Buffer_Limit 32 performs a policing function in the downstream node 12b to protect against misbehaving transmitters. Specifically, the Buffer_Limit 32 indicates the maximum number of cell buffers that may be used by the input queue in downstream node 12b by the connection 22. In most cases BS_Limit 26 is equal to Buffer_Limit 32. At some point, though, it may be necessary to adjust the maximum number of cell buffers available for connection 22 up or down. This function is coordinated by network management software to avoid the "dropping" of data cells in transmission, an increase of buffers per connection is reflected first in Buffer_Limit 32 prior to BS_Limit 26. Conversely, a reduction in the number of receiver buffers per connection 22 is reflected first in BS_Limit 26 and thereafter in Buffer_Limit 32.

Buffer_Counter 31 provides an indication of the number of buffers in the downstream node 12b which are currently being used for storage of data cells for connection 22. As described subsequently, this value is used in providing the upstream node 12a with a more accurate picture of buffer availability in the downstream node 12b. Both the Buffer_Limit 32 and the Buffer_Counter 31 are 14 bits wide in this embodiment.

N2_Limit 34 determines the frequency of connection flow rate communication to the upstream node 12a. A cell containing such flow rate information is sent upstream every time the downstream node 12b forwards a number of cells equal to N2_Limit 34 out of downstream node 12b. This updating activity is further described subsequently. In this embodiment, N2_Limit 34 is 6 bits wide.

N2_Counter 36 is used to keep track of the number of cells which have been forwarded out of downstream node 12b since the last time the N2_Limit 34 was reached. In this embodiment N2_Counter 36 is 6 bits wide.

Fwd_Counter 38 is used to maintain a running count of the total number of cells forwarded through downstream node 12b. This includes buffers released when data cells are utilized for data frame construction in an end-node. When the maximum count for this counter 38 is reached, the counter rolls over to 0 and continues. The total number of cells received by downstream node 12b can be derived by adding Buffer_Counter 31 to Fwd_Counter 38. The latter is employed in correcting the upstream node 12a for errored cells during the check event, as described below. Fwd_Counter 38 is a 28-bit-wide counter in this embodiment.

Rx_Counter 30 may also be maintained by downstream node 12b for connection 22. This counter is incremented each time the downstream node 12b receives a data cell through connection 22. The value of Rx_Counter 30 is then usable directly in response to check cells and in the generation of an update cell, both of which will be described further below. Similar to the Fwd_Counter 38, Rx_Counter 30 is 28 bits wide in this embodiment.

There are two events in addition to a steady state condition in the link per connection flow control protocol: update and check. In steady state, data cells are transmitted from upstream node 12a to downstream node 12b. In update, buffer occupancy information is returned upstream by downstream node 12b to correct counter values in upstream node 12a. Check mode is used to check for cells lost or injected due to transmission errors between upstream node 12a and downstream node 12b.

Prior to any activity, counters in the upstream and downstream nodes 12a, 12b are initialized. Initialization includes zeroing counters and providing initial values to limit registers such as BS_Limit 26, Buffer_Limit 32, and N2_Limit 34. Buffer_Limit 32 is initialized to (RTT times BW plus N2), which represents the roundtrip time times the virtual connection bandwidth.

BS_Counter 24 and Tx_Counter 28 are incremented whenever upstream node 12a transmits a data cell over connection 22, assuming flow control is enabled. Upon receipt of the data cell, downstream node 12b checks whether Buffer_Counter 31 equals or exceeds Buffer_Limit 32, which would be an indication that there are no buffers available for receipt of the data cell. If this test fails, the data cell is discarded. Otherwise, the Buffer_Counter 31 and Rx_Counter 30 are incremented and the data cell is deposited in a buffer cell associated with an input queue for connection 22. The Tx_Counter 28 and the Rx_Counter 30 roll over when they meet their maximum. If flow control is not enabled, none of the presently described functionality is activated.

When a data cell is forwarded out of downstream node 12b, Buffer_Counter 31 is decremented. Buffer_Counter 31 should never exceed Buffer_Limit 32 when the connection level flow control protocol is enabled, with the exception of when the BS_Limit 26 has been decreased and the downstream node 12b has yet to forward sufficient cells to bring Buffer_Counter 31 below Buffer_Limit 32. If a data cell is received when Buffer_Counter 31 is greater than or equal to Buffer_Limit 32, then the cell is discarded and an error condition is indicated for that connection 22.

A buffer state update occurs when the downstream node 12b has forwarded a number of data cells equal to N2_Limit 34 out of downstream node 12b. In an embodiment of the invention maintaining Fwd_Counter 38, update involves the transfer of the value of Fwd_Counter 38 from the downstream node 12b back to the upstream node 12a in an update cell. In an embodiment of the invention employing Rx_Counter 30 in downstream node 12b, the value of RX_Counter 30 minus Buffer_Counter 31 is conveyed in the update cell. At the upstream node 12a, the update cell is used to update the value in BS_Counter 24. Because BS_Counter 24 is independent of buffer allocation information, buffer allocation can be changed without effecting the performance of this aspect of this link per connection flow control.

Update cells utilize allocated bandwidth to insure a bounded delay. This delay needs to be accounted for as a component of round trip time, to determine the buffer allocation for the respective connection.

The amount of bandwidth allocated to the update cells is a function of a counter. This counter forces the scheduling of update and check cells, the latter to be discussed subsequently. There is a corresponding counter which controls the space between update cells. Normal cell packing is seven records per cell, and the minimum update interval is similarly set to seven. Since this embodiment can only process one update record per cell time, back-to-back, fully packed update cells at upstream node 12a would cause some records to be dropped.

An update event occurs as follows. When the downstream node 12b forwards (releases) a cell, Buffer_Counter 31 is decremented and N2_Counter 36 and Fwd_Counter 38 are incremented. When the N2_Counter 36 is equal to N2_Limit 34, downstream node 12b prepares an update cell for transmission back to upstream node 12a and N2_Counter 36 is set to 0. The transmitter at downstream node 12b receives a connection indicator from the downstream node 12b forwarded cell to identify which connection 22 is to be updated. In one embodiment, the Fwd_Counter 38 is inserted into an update record payload. In another embodiment, the Rx_Counter 30 value minus the Buffer_Counter 31 value is inserted into the update record. When an update cell is fully packed with records, or as the minimum bandwidth pacing interval is reached, the update cell is transmitted to the upstream node 12a and the N2_Counter 36 is reset to 0.

Upstream node 12a receives the connection indicator from the update record to identify the transmitter connection, and extracts the Fwd_Counter 38 value or the Rx_Counter 30 minus Buffer_Counter 31 value from the update record. BS_Counter 24 is reset to the value of Tx_Counter 28 minus the update record value. If this connection was disabled from transmitting due to BS_Counter 24 being equal to or greater than BS_Limit 26, this condition should now be reversed, and if so the connection should again be enabled for transmitting.

In summary, the update event provides the upstream node 12a with an indication of how many cells originally transmitted by it have now been released from buffers within downstream node 12b, and thus provides the upstream node 12a with a more accurate indication of downstream node 12b's buffer availability for connection 22.

The buffer state check event serves two purposes: (1) it provides a mechanism to calculate and compensate for cell loss or cell insertion due to transmission error; and (2) it provides a mechanism to start (or restart) a flow if update cells were lost or if enough data cells were lost that N2_Limit 34 is never reached.

One timer (not explicitly shown) serves all connections. The connections are enabled or disabled on a per basis as to whether to send check cells from the upstream node 12a to the downstream node 12b. The check process in the upstream node 12a involves searching all of the connection descriptors to find one which is check enabled. Once a minimum pacing interval has elapsed (the check interval), the check cell is forwarded to the downstream node 12b and the next check enabled connection is identified. The spacing between check cells for the same connection is a function of the number of active flow controlled connection times the mandated spacing between check cells for all connections. Check cells have priority over update cells.

The check event occurs as follows. Each upstream node 12a connection is checked after an interval of time. If the connection is flow control enabled and the connection is valid, then a check event is scheduled for transmission to downstream node 12b. A buffer state check cell is generated using the Tx_Counter 28 value for that connection in the check cell payload, and is transmitted using the connection indicator from the respective connection descriptor.

In one embodiment, a calculation of errored cells is made at the downstream node 12b by summing Fwd_Counter 38 with Buffer_Counter 31 and subtracting this value from the contents of the transmitted check cell record, the value of Tx_Counter 28. The value of Fwd_Counter 38 is increased by the errored cell count. An update record with the new value for Fwd_Counter 38 is then generated. This updated Fwd_Counter 38 value subsequently updates the BS_Counter 24 value in the transmitter element 12.

In the second embodiment, the same is accomplished by resetting the Rx_Counter 30 value equal to the check cell payload value (Tx_Counter 28). A subsequent update record is established using the difference between Rx_Counter 30 and Buffer_Counter 31.

Thus, the check event enables accounting for cells transmitted by the upstream node 12a, through the connection 22, but either dropped or not received by downstream node 12b.

A "no cell loss" guarantee is enabled using buffer state accounting at the connection level because the upstream node 12a has an up-to-date account of the number of buffers in the downstream node 12b available for receipt of data cells and has an indication of when data cell transmission should be ceased due to the absence of available buffers downstream.

In order to augment the foregoing protocol with a receiver element buffer-sharing mechanism, link level flow control, also known as link-level buffer state accounting is added to per connection flow control. It is possible for such link level flow control to be implemented without link per connection flow control. However, a combination of the two is preferable since without link per connection flow control there would be no restriction on the number of buffers a single connection might consume.

It is desirable to perform buffer state accounting at the link level, in addition to the connection level, for the following reasons. Link level flow control enables cell buffer sharing at a receiver element well maintaining the "no cell loss" guarantee afforded by link per connection flow control. Buffer sharing results in the most efficient use of a limited number of buffers. Rather than provide a number of buffers equal to a bandwidth times RTT for each connection, a smaller number of buffers is employable in the downstream node 12b because not all connections require a full complement of buffers at any one time.

A further benefit of link level flow control is that each connection is provided with an accurate representation of downstream buffer availability without necessity increased reverse bandwidth for each connection. A high frequency link level update does not significantly affect overall per-connection bandwidth.

Referring again to FIG. 3, Link_BS_Counter 40 tracks all cells in flight between upstream node 12a and elements downstream of downstream node 12b, including cells in transit between upstream node 12a and downstream node 12b and cells stored within input buffers within downstream node 12b. As with the update event described above with respect to link per connection flow control, Link_BS_Counter 40 is modified during a link update event by subtracting either the Link_Fwd_Counter 56 value or the difference between Link_Rx_Counter 46 and Link_Buffer_Counter 50 from the Link_Tx_Counter 44 value.

Link_BS_Limit 42 limits the number of shared downstream cell buffers in downstream node 12b to be shared among all of the flow control enabled connections. In one embodiment Link_BS_Counter 40 and Link_BS_Limit 42 are both 20 bits wide.

Link_Tx_Counter 44 tracks all cells transmitted onto the Link 14. It is used during the link level update event to calculate a new value for Link_BS_Counter 40. Link_Tx_Counter 44 is a 28 bit wide counter in this embodiment.

In downstream node 12b, a set of counters is also maintained for each Link 14. Link_Buffer_Limit 48 performs a function in downstream node 12b similar to Link_BS_Limit 42 in upstream node 12a by indicating the maximum number of cell buffers in downstream node 12b available for use by all connections. In most cases, Link_BS_Limit 42 is equal to Link_Buffer_Limit 48. The effect of adjusting the number of buffers available up or down on a link-wide basis is the same as that described above with respect to adjusting the number of buffers available for a particular connection 22. Link_Buffer_Limit 48 is 20 bits wide in this embodiment.

Link_Buffer_Counter 50 provides an indication of the number of buffers in downstream node 12b which are currently being used by all connections for the storage of data cells. This value is used in a check event to correct the Link_Fwd_Counter 56 (described subsequently). The Link_Buffer_Counter 50 is 20 bits wide in this embodiment.

Link_N2_Limit 52 and Link_N2_Counter 54, each 8 bits wide in this embodiment, are used to generate link update records, which are intermixed with connection level update records. Link_N2_Limit 52 establishes a threshold number for triggering the generation of link level update records, and Link_N2_Counter 54 and Link_Fwd_Counter 56 are incremented each time a cell is released out of a buffer cell in the downstream node 12b. In this embodiment Link_N2_Limit 52 is static once initially configured. However, each can be made dynamically adjustable based upon measured bandwidth.

Link_Fwd_Counter 56 tracks all cells released from input queues in downstream node 12b that came from the Link 14 in question. It is 28 bits wide in this embodiment and is used in the update event to recalculate Link_BS_Counter 40.

Link_Rx_Counter 46 is employed in an alternative embodiment in which Link_Fwd_Counter 56 is not employed. It is also 28 bits wide and tracks the number of cells received across all connections in Link 14.

Normal data transfer by upstream node 12a to downstream node 12b is enabled across all connections in Link 14 as long as the Link_BS_Counter 40 is less than or equal to Link_BS_Limit 42. This test prevents upstream node 12a from transmitting more data cells than it believes are available in downstream node 12b. The accuracy of this belief is maintained through the update and check events described next.

A data cell is received at downstream node 12b if neither connection level or link level buffer limits are exceeded. If a limit is exceeded, then the cell is discarded. The update event at the link level involves the generation of a link update record when the value in Link_N2_Counter 54 reaches (equals or exceeds) the value in Link_N2_Limit 52. In this embodiment, Link_N2_Limit 52 is set to 40.

The link update record, the value taken from Link_Fwd_Counter 56 is mixed with the per connection update records (the value of Fwd_Counter 38) and update cells transferred to upstream node 12a. In one embodiment, the value of Link_Rx_Counter 46 minus Link_Buffer_Counter 50 is mixed with the per connection update records. When upstream node 12a receives the update cell having the link update record, it sets the Link_BS_Counter 40 equal to the value of Link_Tx_Counter 44 minus the value in the update record. Thus, Link_BS_Counter 40 in the upstream node 12a is set to reflect the number of data cells transmitted by upstream node 12a but not yet released in downstream node 12b.

The check event at the link level involves the transmission of a check cell having the Link_Tx_Counter 44 value by the upstream node 12a every "W" check cells. In a first embodiment, W is equal to 4. At downstream node 12b, the previously described check functions at the connection level are performed as well as an increase in the Link_Fwd_Counter 56 value by an amount equal to the check record contents, Link_Tx_Counter 44, minus the sum of Link_Buffer_Counter 50 plus Link_Fwd_Counter 56 in one embodiment. In an alternative embodiment, Link_Rx_Counter 46 is reset to the contents of the check record (Link_Tx_Counter 44). This is an accounting for errored cells in a link-wide basis. An update record is then generated having a value taken from the updated Link_Fwd_Counter 56 or a Link_Rx_Counter 46 values.

The check event is performed at the link level in addition to the connection level in order to readjust the Link_Fwd_Counter 56 value or Link_Rx_Counter 46 value quickly in the case of large transient link failures.

The following are exemplary initial values for the illustrated counters in an embodiment having 100 connections in one link: BS_Limit equals 20, Buffer_Limit equals 20, N2_Limit equals 3, Link_BS_Limit equals 1000, Link_N2_Counter equals 40. The BS_Limit value equals the Buffer_Limit value for both the connections and the link. Though BS_Limit and Buffer_Limit 32 are both equal to 20, and there are 100 connections in this link, there are only 1000 buffers in the downstream node 12b as reflected by Link_BS_Limit 42 and Link_Buffer_Limit 48. This is because of the buffer pool sharing enabled by link level feedback.

The presently described invention can be further augmented with a dynamic buffer allocation scheme such as previously described with respect to N2_Limit 34 and Link_N2_Limit 52. This scheme includes the ability to dynamically adjust limiting parameters such as BS_Limit 26, Link_BS_Limit 42, Buffer_Limit 32, and Link_Buffer_Limit 48, in addition to N2_Limit 34 and Link_N2_Limit 52. Such adjustment is in response to major characteristics of the individual connections or the entire link in one embodiment, and is established according to a determined priority scheme in another embodiment. Dynamic buffer allocation thus provides the ability to prioritize one or more connections or links given a limited buffer resource.

On a link-wide basis, as the number of connections within the link increases, it may be desirable to decrease Link_N2_Limit 52 in light of an increased number of connection because accurate buffer sharing among many connections is desired. Conversely, if the number of connections within the link decreases, Link_N2_Limit 52 may be decreased, because the criticality of sharing limited resources among a relatively small number of connections is decreased.

In addition to adjusting the limits on a per-link basis, it may also be desirable to adjust limits on a per-connection basis in order to change the maximum sustained bandwidth for the connection. The presently disclosed dynamic allocation schemes are implemented during link operation, based upon previously prescribed performance goals.

Although the present invention has been described in detail, it should be understood that various changes, substitutions, and alterations can be made hereto without departing from the spirit and scope of the invention as defined by the appended claims.

What is claimed is:

1. A method for reducing information loss in a communications network, comprising:

establishing a plurality of virtual connections over a first link from a first node in the communications network to a second node in the communications network, wherein the second node includes a plurality of input queues coupled to a switching network, the switching network coupled to a plurality of output queues;

associating each virtual connection with a first output queue in the first node and with a second input queue and a second output queue in the second node;

providing a connection feedback signal from the second node to the first node for each virtual connection, the connection feedback signal for a particular virtual connection including data reflecting a status of the second input queue associated with the particular virtual connection;

controlling a flow of information between the first node and the second node for each virtual connection in response to the connection feedback signal;

providing a switch feedback signal from the second output queue to the second input queue for each virtual connection, the switch feedback signal for a particular virtual connection including data reflecting a status of the second output queue associated with that virtual connection;

controlling a flow of information between the second input queue and the second output queue for each virtual connection in response to the switch feedback signal.

2. The method of claim 1, wherein the first link carries additional virtual connections for which no connection feedback signal is generated.

3. The method of claim 1, wherein the first link carries additional virtual connections for which no switch feedback signal is generated.

4. The method of claim 1, further comprising:

creating at least one pool of buffer space that is shared between at least some of the second input queues;

providing a link feedback signal from the second node to the first node for each pool of buffer space created, the link feedback signal for a particular pool of buffer space including data reflecting the status of that pool of buffer space;

controlling a flow of information between the first node and the second node in response to a particular link feedback signal by controlling the flow of information between the first node and the second node for each virtual connection whose second input queue shares the pool of buffer space associated with the particular link feedback signal.

5. The method of claim 4, wherein the virtual connections include a series of asynchronous transfer mode cells.

6. A communications device for reducing information loss in a communications network, comprising:

an input link connected to the communications network and operable to receive information over a plurality of virtual connections from a signal source;

a plurality of input queues operable to store the information received from the input link, each input queue associated with one of said virtual connections;

a plurality of output queues operable to store the information received from the plurality of input queues, each output queue associated with one of said virtual connections;

flow control circuitry coupled to the input link, the plurality of input queues, and the plurality of output queues wherein the flow control circuitry is operable to provide a first connection feedback signal from each of the plurality of input queues to the signal source for each virtual connection, the connection feedback signal for a particular virtual connection including data reflecting a status of the respective input queue, control a flow of information between the signal source and the plurality of input queues in response to each first connection feedback signal, provide a switch feedback signal from the output queue to the input queue for each virtual connection, the switch feedback signal for a particular virtual connection including data reflecting a status of the respective output queue, and control a flow of information between the input queue and the output queue for each virtual connection in response to the switch feedback signal.

7. The communications device of claim 6, further comprising:

an output link coupled to at least some of the plurality of output queues, wherein the flow control circuitry is further operable to receive a second connection feedback signal over the output link for each output queue coupled to the output link and to control a flow of information from each output queue coupled to the output link in response to the second connection feedback signal.

8. The communications device of claim 6, further comprising:

at least one pool of buffer space that is shared between at least some of the plurality of input queues, wherein the flow control circuitry is further operable to provide a link feedback signal from the plurality of input queues to the signal source for each virtual connection sharing the pool of buffer space, the link feedback signal for a particular pool of buffer space including data reflecting the status of that pool of buffer space.

9. The communications device of claim 8 wherein each of the virtual connections include a series of asynchronous transfer mode cells.

10. A communications network operable to reduce information loss, comprising:

a plurality of nodes;

a plurality of links each connecting one of the plurality of nodes to another of the plurality of nodes;

wherein each node comprises a communications device, the communications device further comprising:

an input link connected to the communications network and operable to receive information over a plurality of virtual connections from a first one of the plurality of nodes, wherein the input link is one of the plurality of links;

a plurality of input queues each operable to store information received from a respective one of the plurality of virtual connections;

a plurality of output queues each operable to store information received from a respective one of the plurality of virtual connections;

flow control circuitry coupled to the input link, the plurality of input queues, and the plurality of output queues wherein the flow control circuitry is operable to:

provide a first connection feedback signal from each of the plurality of input queues to a respective one of the plurality of nodes for each virtual connection, the first connection feedback signal for a particular virtual connection including data reflecting a status of the respective input queue, control a flow of information between the respective one of the plurality of nodes and the respective input queue in response to the first connection feedback signal, provide a switch feedback signal from the output queue to the input queue for each virtual connection, the switch feedback signal for a particular virtual connection comprising data reflecting a status of the respective output queue, control a flow of information between the input queue and the output queue for each virtual connection in response to the switch feedback signal.

11. The communications network of claim 10, wherein the communications device further comprises:

an output link coupled to at least some of the plurality of output queues wherein the output link is one of the plurality of links, wherein the flow control circuitry is further operable to receive a second connection feedback signal over the output link for each output queue coupled to the output link and to control a flow of information from each output queue coupled to the output link in response to the second connection feedback signal.

12. The communications network of claim 10, wherein the communications device further comprises:

at least one pool of buffer space that is shared between at least some of the plurality of input queues, wherein the flow control circuitry is further operable to provide a link feedback signal from the plurality of input queues to the first node for each virtual connection sharing the pool of buffer space, the link feedback signal for a particular pool of buffer space including data reflecting the status of that pool of buffer space.

13. The communications network of claim 12 wherein each of the virtual connections includes a series of asynchronous transfer mode cells.

14. The communications network of claim 13, wherein the communications device further comprises:

an output link coupled to at least some of the plurality of output queues wherein the output link is one of the plurality of links, wherein the flow control circuitry is further operable to receive a second connection feedback signal over the output link for each output queue coupled to the output link and to control a flow of information from each output queue coupled to the output link in response to the second connection feedback signal.

15. The communications network of claim 14, wherein at least some of the virtual connections include available bit rate connections.

16. The communications network of claim 15, wherein at least one pool of buffer space includes buffer space that is shared between all input queues associated with the available bit rate connections.

17. A method for reducing information loss in a communications network, comprising:

establishing a virtual connection over a first link from a first node in the communications network to a second node in the communications network, wherein the second node comprises at least one second input queue coupled to a switching network, the switching network coupled to at least one output queue;

associating the virtual connection with a first output queue in the first node and with a second input queue and at least one second output queue in the second node;

providing a connection feedback signal from the second node to the first node for the virtual connection, the connection feedback signal comprising data reflecting the status of the second input queue associated with the virtual connection;

controlling the flow of information between the first node and the second node for the virtual connection in response to the connection feedback signal;

providing a switch feedback signal from each of the second output queues to the second input queue for the virtual connection, each switch feedback signal comprising data reflecting the status of each of the second output queues associated with the virtual connection;

controlling the flow of information between the second input queue and the at least one second output queue for the virtual connection in response to each switch feedback signal.

18. The method of claim 17, wherein the first link carries additional virtual connections for which no connection feedback signal is generated.

19. The method of claim 17, further comprising:

establishing the virtual connection over at least one second link from the second node to a respective input queue of at least one third node in the communications network;

providing at least one second connection feedback signal from a respective one of the at least one third node to the second node for the virtual connection, the at least one second connection feedback signal comprising data reflecting the status of the at least one third node input queue associated with the virtual connection; and controlling the flow of information between the second and the at least one third node for the virtual connection in response to the at least one second connection feedback signal.

20. The method of claim 19, further comprising:

creating a pool of buffer space that is shared between input queues of the at least one third node including the at least one third node input queue associated with the virtual connection;

providing a link feedback signal from the at least one third node to the second node for the pool of third node buffer space created, the link feedback signal comprising data reflecting the status of the pool of third node buffer space; and controlling the flow of information between the second node and a respective one of the at least one third node in response to a particular link feedback signal.

21. The method of claim 17, further comprising:

creating at least one pool of buffer space that is shared between at least some of the second input queues;

providing a link feedback signal from the second node to the first node for each pool of buffer space created, the link feedback signal for a particular pool of buffer space comprising data reflecting the status of that pool of buffer space;

controlling the flow of information between the first node and the second node in response to a particular link feedback signal by controlling the flow of information between the first node and the second node for each virtual connection whose second input queue shares the pool of buffer space associated with the particular link feedback signal.

22. A communication device for reducing information loss in a communications network, comprising:

an input link connected to the communications network and operable to receive information from a virtual connection from a signal source;

a plurality of input queues, wherein the virtual connection has one of the input queues associated therewith;

a plurality of output queues, wherein the virtual connection has a subset of the output queues associated therewith;

flow control circuitry coupled to the input link, the plurality of input queues, and the plurality of output queues wherein the flow control circuitry is operable to provide a first connection feedback signal from the communications device to the source for the virtual connection, the first connection feedback signal comprising data reflecting the status of the input queue associated with the virtual connection, provide switch feedback signals from each output queue of the output queue subset to the input queue for the virtual connection, the switch feedback signals comprising data reflecting the status of the respective output queues, and control the flow of information between the input queue and the output queue subset in response to the switch feedback signals associated with the virtual connection.

23. The communications device of claim 22, further comprising:

an output link coupled to at least one of the subset of output queues; and wherein the flow control circuitry is further operable to receive a second connection feedback signal for each output queue of the output queue subset coupled to the output link and to control the flow of information between each output queue of the output queue subset coupled to the output link and the output link in response to the second connection feedback signal.

24. The communications device of claim 23, further comprising:

a destination device having input queues and in communication with the output link and having a pool of buffer space shared between at least some of the destination device input queues; and wherein the flow control circuitry is further operable to receive a link feedback signal from the destination device via the output link, the link feedback signal comprising data reflecting status of the destination device buffer pool.

25. The communications device of claim 22, further comprising:

a pool of buffer space that is shared between at least some of the input queues including the input queue associated with the virtual connection; and wherein the flow control circuitry is further operable to provide a link feedback signal from the communications device to the source of the virtual connection, the link feedback signal generated for the pool of buffer space and comprising data reflecting the status of the pool of buffer space.

26. A method for reducing information loss in a communications network, comprising:

establishing a virtual connection over at least one first link from at least one first node in the communications network to a second node in the communications network, wherein the second node comprises a plurality of input queues coupled to a switching network, the switching network coupled to at least one output queue;

associating the virtual connection with first output queues in respective ones of the at least one first node and with respective ones of the second input queues and a second output queue in the second node;

providing connection feedback signals from the second node to the at least one first node for the virtual connection, the connection feedback signals each comprising data reflecting the status of a respective second input queue associated with the virtual connection;

controlling the flow of information between the at least one first node and the second node for the virtual connection in response to the connection feedback signals;

providing switch feedback signals from the second output queue to the second input queues for the virtual connection, the switch feedback signals comprising data reflecting the status of the second output queue associated with the virtual connection; and controlling the flow of information between the second input queues and the second output queue for the virtual connection in response to the switch feedback signals.

27. The method of claim 26, wherein the at least one first link carries additional virtual connections for which no connection feedback signals are generated.

28. The method of claim 26, further comprising:

creating at least one pool of buffer space that is shared between second input queues including at least one of the second input queues associated with the virtual connection;

providing a link feedback signal from the second node to one of the first nodes for one of the at least one first links and for each pool of buffer space created, the link feedback signal for a particular pool of buffer space comprising data reflecting the status of that pool of buffer space;

controlling the flow of information between the one first node and the second node in response to the link feedback signal.

29. A communications device for reducing information loss in a communications network, comprising:

at least one input link connected to the communications network, wherein information from a virtual connection is received from at least one signal source over the at least one input link;

a plurality of input queues, wherein the virtual connection has a subset of the input queues associated therewith;

a plurality of output queues, wherein the virtual connection has an output queue associated therewith;

flow control circuitry coupled to the at least one input link, the plurality of input queues, and the plurality of output queues wherein the flow control circuitry is operable to provide first connection feedback signals from the communications device to the at least one signal source for the virtual connection, the connection feedback signals comprising data reflecting the status of the input queue subset, provide switch feedback signals from the output queue to the subset of input queues for the virtual connection, the switch feedback signals comprising data reflecting the status of the output queue, and control the flow of information between the input queue subset and the output queue for the virtual connection in response to the switch feedback signals.

30. The communications device of claim 29, further comprising:

an output link coupled to the output queue; and wherein the flow control circuitry is further operable to receive a second connection feedback signal for the output queue coupled to the output link and to control the flow of information between the output queue and the output link in response to the second connection feedback signal.

31. The communications device of claim 29, further comprising:

at least one pool of buffer space that is shared between at least some of the input queues including at least one of the subset of input queues; and wherein the flow control circuitry is further operable to provide at least one link feedback signal from the communications device to the source associated with the at least one of the subset of input queues, the link feedback signal generated for each pool of buffer space and comprising data reflecting the status of that pool of buffer space.

* * * * *